United States Patent
Huang et al.

(10) Patent No.: US 7,957,592 B2
(45) Date of Patent: Jun. 7, 2011

(54) VIDEO OBJECT SEGMENTATION METHOD AND SYSTEM

(75) Inventors: Tsung-Jen Huang, Taichung (TW); Cheng-Min Lee, Hsinchu County (TW); Yi-Ching Liaw, Changhua County (TW); Jim Zong-Chang Lai, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1019 days.

(21) Appl. No.: 11/766,800

(22) Filed: Jun. 22, 2007

(65) Prior Publication Data

US 2008/0130744 A1    Jun. 5, 2008

(30) Foreign Application Priority Data

Nov. 30, 2006   (TW) ................ 95144427 A

(51) Int. Cl.
G06K 9/34   (2006.01)
(52) U.S. Cl. ............................................ 382/173
(58) Field of Classification Search ............... 382/173
See application file for complete search history.

(56) References Cited

U.S. PATENT DOCUMENTS

| | | | |
|---|---|---|---|
| 6,870,945 B2 | 3/2005 | Schoepflin et al. | |
| 6,973,213 B2 | 12/2005 | Fan et al. | |
| 2001/0024518 A1* | 9/2001 | Yaguchi | 382/170 |
| 2003/0147561 A1* | 8/2003 | Faibish et al. | 382/245 |
| 2010/0290710 A1* | 11/2010 | Gagvani et al. | 382/224 |

OTHER PUBLICATIONS

Shao-Yi Chien; Shyh-Yih Ma; Liang-Gee Chen; , "Efficient moving object segmentation algorithm using background registration technique," Circuits and Systems for Video Technology, IEEE Transactions on , vol. 12, No. 7, pp. 577-586, Jul. 2002.*

Meier, T.; Ngan, K.N.; , "Automatic segmentation of moving objects for video object plane generation," Circuits and Systems for Video Technology, IEEE Transactions on , vol. 8, No. 5, pp. 525-538, Sep. 1998.*

Pan et al. Real-time Video Surveillance Using Fuzzy Self-Organizing Neural Network, Thesis from National Central University, Taiwan, Jun. 2006. Please refer to p. 3 for Abstract.

* cited by examiner

*Primary Examiner* — Brian P Werner
*Assistant Examiner* — Nirav G Patel
(74) *Attorney, Agent, or Firm* — Jianq Chyun IP Office

(57) ABSTRACT

A method and system of video object segmentation are disclosed herein. A pixel data of an image is received, wherein the pixel data has a corresponding location. A difference value between a pixel value of the pixel data and a pixel value in the corresponding location of a previous image is obtained. Utilizing the difference value and the pixel data, a multi-layered background registration is performed to get a background. Using the background, a background region of the image is removed. Furthermore, a process of removing an average value of luminance from the image and from the background is carried out to prevent object segmentation failure caused by the non-uniform luminance problem, which is produced by variation and flickering of illumination.

34 Claims, 4 Drawing Sheets

VIDEO OBJECT SEGMENTATION METHOD AND SYSTEM

CROSS-REFERENCE TO RELATED APPLICATION

This application claims the priority benefit of Taiwan application serial no. 95144427, filed Nov. 30, 2006. All disclosure of the Taiwan application is incorporated herein by reference.

BACKGROUND OF THE INVENTION

1. Field of the Invention

The present invention relates to a video method, and more particularly to a video object segmentation method and system.

2. Description of Related Art

With the public awareness of home safety and the special health and medical care for the old and weak, industries related to the security and safety monitoring services flourish. Most security and safety monitoring services involve monitoring images and segmenting the monitored image into foreground images. Then, the foreground images are tracked or identified to achieve the goal of security monitoring and telecaring. However, the great quantity of image data that needs to be processed for home care and security monitor services are significant and involves privacy concerns, and hence the images are recorded in frames. Therefore, correctly segmenting out meaningful foreground images, so that they can be efficiently processed or recorded, is increasingly important.

The conventional method of segmenting a video object includes obtaining the required background after the image has gone through a statistical calculation cycle and then using the background to make the object be segmented out. However, in a video environment where several groups of cameras are periodically switched to play and monitor, it is impossible to get the required background for the object segmentation in time due to a restriction imposed by the lowest number of effective images that can be sampled. Furthermore, in a real environment, the natural change and flicker of the light source, the change of the shading or the aperture of the camera may lead a shift in the luminance of the entire image or part of the image. Therefore, judgment errors may occur when images are compared or objects are segmented.

FIG. 1 is a flow diagram showing a conventional method of efficiently moving object segmentation using the background registration technique. The technique is disclosed in the article "Efficient Moving Object Segmentation Algorithm Using Background Registration Technique," IEEE Transactions on Circuit and Systems for Video Technology, Vol. 12, No. 7, July 2002, pp. 577-586. The method includes processing an input image $F_n$ through a gradient filter (in step S101). The gradient filtering includes subtracting the image obtained by performing an erosion of morphological operation on the image $F_n$ from the image obtained by performing a dilation of morphological operation on the image $F_n$ so as to eliminate object segmentation error resulting from shadows and produce gradient filtered image $F_n'$. Then, a segmentation algorithm (step S103) between the image $F_n'$ and a previous image $F_{n-1}'$ stored in a frame buffer (step S102) is performed to obtain a moving object. Finally, an erosion of morphological operation of the segmented foreground image is performed to eliminate the error pixel caused by the gradient filter (step S104). However, this method provides inferior object segmentation when the edges are not so clearly defined.

FIG. 2 is a flow diagram showing a conventional detection of moving cast shadow method for object segmentation. The method is disclosed in the article "Detection of Moving Cast Shadow for Object Segmentation," IEEE Transactions on Multimedia, Vol. 1, No. 1, March 1999, pp. 65-67. The method mainly involves detecting and eliminating shadow areas (step S201) and includes three kinds of processing treatments. The first kind of processing treatment is the detection of static background edge (step S202) for extracting the image of static background edge. The second kind of processing treatment is the detection of uniform changes of shading (step S203) for extracting the image of uniform-changing shading areas. The third kind of treatment is the penumbra detection (step S204) for extracting the image of the penumbra area. Finally, the three foregoing types of images are used to detect the changed areas due to the moving cast shadows (step S205) and then object segmentation is performed. Although the method takes into consideration the erroneous judgment in the object segmentation due to moving cast shadows, the algorithm is complicated so that instantaneous object segmentation is impossible. Hence, the method is unsuitable for operating in a real-time environment.

Furthermore, U.S. Pat. No. 6,870,945 proposed a "Video object tracking by estimating and subtracting background" technique. The idea behind the patent is that any changes in the image require an initial cycle, for example, the embodiment mentioned a three consecutive image frame cycle, for renewing the foreground or background mask before the object can be correctly segmented. In addition, when the luminance of the light source changes, flickers or the shading causes problems such as non-uniform luminance or a shift in the luminance of the image, erroneous judgment of the foreground or background may easily occur.

In addition, U.S. Pat. No. 6,973,213 also proposed a "Background-based segmentation" technique. The idea behind the patent is to utilize a low pass filter to extract a background image block and utilize a resolution refinement method to extract an object image block and then perform a classification. However, this method is only suitable for optical character recognition.

SUMMARY OF THE INVENTION

Accordingly, the present invention provides a video object segmentation method and system that utilize multi-layered registration to store pixel data holding static for a preset time period as background data in an image database so that a suitable background can be instantly retrieved without having to wait for another cycle of calculation when the pixel changes.

The present invention may provide a video object segmentation method and system that performs a process of removing an average of luminance from the image and from the background so as to avoid problems such as non-uniform luminance, or luminance shifting of image, which those problems are resulted in that the light source changes, or flickers, the shading changes, or image-sampling devices.

Examples of the present invention may provide a video object segmentation method that includes receiving a pixel data of an image. The pixel data has a corresponding location. A first difference value between a pixel value of the pixel data and a pixel value in the corresponding location of a previous image is obtained. Utilizing the first difference value and the pixel data, a multi-layered background registration is performed to get a background. Using the background, a background region of the image is removed.

In the foregoing video object segmentation method, the multi-layered background registration in one embodiment includes the step of providing an image database that saves k layers of background data, $1 \leq k \leq n$ wherein n is the maximum number of background data in the image database. When the pixel is in a background state and the first difference value is smaller than a threshold value, then a pixel in the corresponding location of the background is the pixel. When the pixel is in a background state and the first difference value is greater than the threshold value, then the pixel is compared with a pixel in the corresponding location of each background data.

Examples of the present invention may provide a video object segmentation method that includes receiving a pixel data of an image, wherein the pixel has a corresponding location. A difference value between a pixel value of the pixel data and a pixel value in the corresponding location of a previous image is obtained, and then a background is taken out. Then, an average of luminance is removed from the image and an average of luminance is removed from the background. After that, the background with its average luminance already removed and the image with its average luminance already removed are used to remove the background region of the image.

Examples of the present invention may provide a video object segmentation system that comprises a retrieving module, an operating module, and a memory module. The retrieving module is used to receiving a pixel of an image, wherein the pixel has a corresponding location. The operating module is used to perform a calculation to find a first difference value between a pixel value of the pixel and a pixel value in the corresponding location of a previous image, and then utilizes the first difference value and the pixel to perform a multi-layered background registration. The memory module is used to save k layers of background data, $1 \leq k \leq n$, wherein n is the maximum quantity of background data that can be stored. The operating module obtains a background from the memory module, and utilizes the background to remove a background region of the image.

In the foregoing video object segmentation system, the video object segmentation system further comprises a luminance controlling module. The luminance controlling module is used to remove an average of luminance from the image and remove an average of luminance from the background. Next, the operating module can utilize the background with the average luminance of the background already removed and the image with the average luminance of the image already removed to remove the background region of the image.

Examples of the present invention may provide a video object segmentation system that comprises a retrieving module, an operating module, and a luminance controlling module. The retrieving module is used to receive a pixel of an image, wherein the pixel has a corresponding location. The operating module is used to perform a calculation to find a first difference value between a pixel value of the pixel and a pixel value in the corresponding location of a previous image, and retrieve a background. The luminance controlling module is used to remove an average of luminance from the image and remove an average of luminance from the background. The operating module utilizes the background with the average luminance of the background already removed and the image with the average luminance of the image already removed to remove a background region of the image.

In the present invention, multi-layered background registration is utilized to save pixel holding static for a preset time period as background data inside an image database. Therefore, when the foreground image of the image moves or disappears to lead the pixel changing, a suitable background can be instantly retrieved to serve as object segmentation or tracking without having to wait for another cycle of renewed background calculation. In addition, to prevent problems of non-uniform luminance or luminance shift of image, which those problems are resulted in that the light source changes, or flickers, the shading changes, or the image-sampling device, a process of removing an average of luminance from the background and the image is also carried out.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
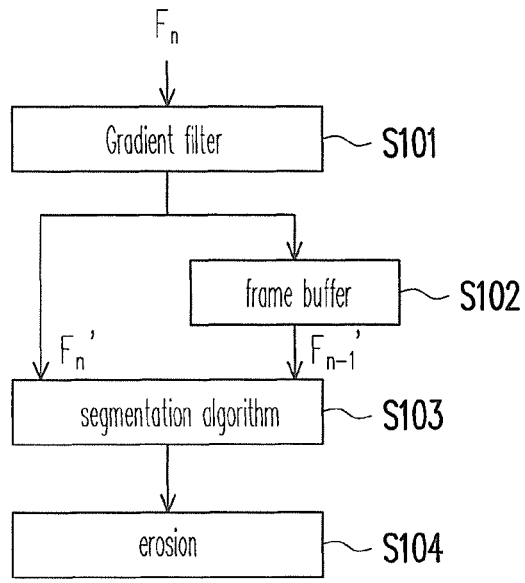
FIG. 1 is a flow diagram showing a conventional method of efficiently moving object segmentation using the background registration technique.
Figure 2:
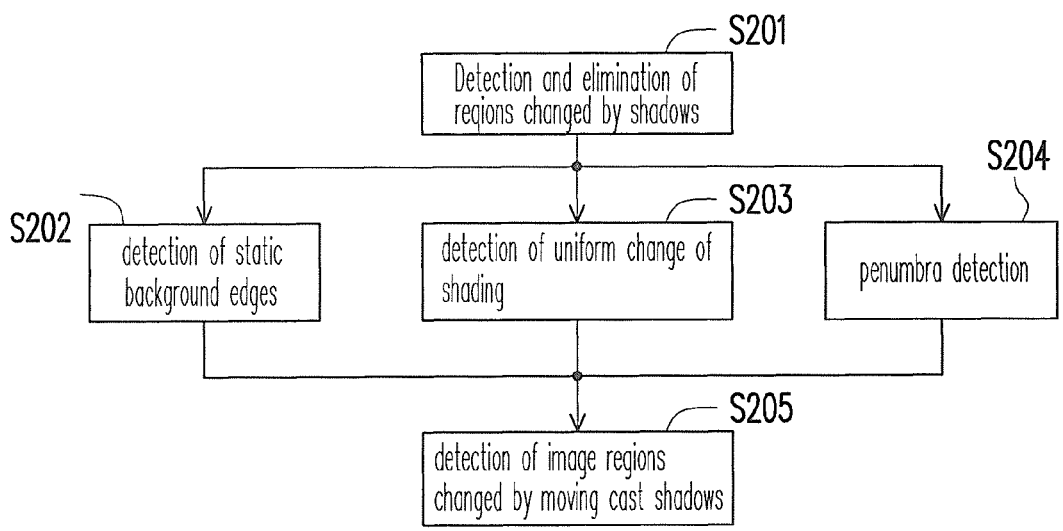
FIG. 2 is a flow diagram showing a conventional detection of moving cast shadow method of object segmentation.

Reference will now be made in detail to the present preferred embodiments of the invention, examples of which are illustrated in the accompanying drawings. Wherever possible, the same reference numbers are used in the drawings and the description to refer to the same or like parts.

Before describing the present invention with an embodiment, the image object segmentation method of the present invention is applied to image monitoring for telecare so that meaningful foreground objects is correctly segmented out for efficient processing and recording. However, the applications of the present invention are not limited to this. It can be applied to security monitoring, a video environment where multiple groups of cameras are cyclically switched to play and to monitor, and so on.

The present invention provide a video object segmentation method that utilizes a multi-layered background registration to save pixel data holding static for a preset time period as background data in an image database. Thus, when a change in the pixel data occurs, a suitable background can be instantly retrieved without having to wait for another calculation cycle to bring out the background. Consequently, the image object segmentation method provided by the present invention is able to correctly segment out a meaningful foreground object using a simplified calculation and performs more efficient processing or recording so that the method can be applied to handheld electronic devices with lower operating capabilities.

The present invention provides a video object segmentation method that performs a process of removing an average of luminance from an image and a background to avoid problems including non-uniform luminance of image and luminance shift of image, which those problems are caused by the change or flicker of the light source, the change of the shading, or an image-sampling device.

Figure 3:
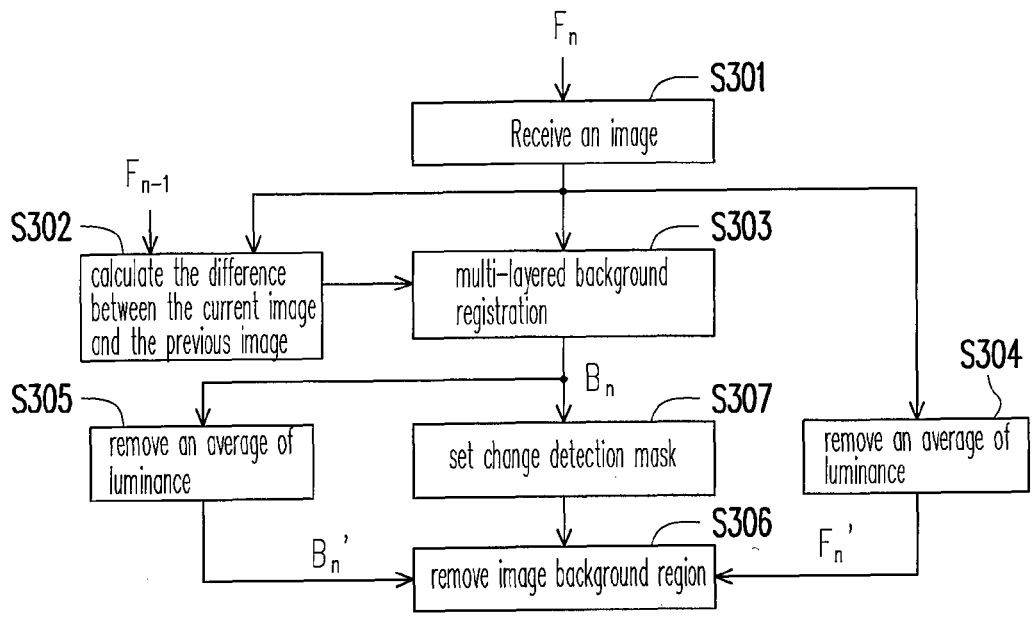
FIG. 3 is a flow diagram showing a video object segmentation method according to one preferred embodiment of the present invention.

FIG. 3 is a flow diagram showing a video object segmentation method according to one preferred embodiment of the present invention. As shown in FIG. 3, a pixel data of an image $F_n$ is received (step S301). A first difference value between a pixel value of the pixel data and a pixel value in the corresponding location of a previous image $F_{n-1}$ is obtained (step S302). Utilizing the first difference value and the pixel data, a multi-layered background registration is performed to get a background $B_n$ (step S303). Using the background $B_n$, the initial change detection mask "CDM" state of the pixel is set (step S307). The purpose of setting the "CDM" state is the capacity to remove a background region of the image rapidly according to the "CDM" when a change in the pixel occurs. To avoid problems including non-uniform luminance or luminance shift of image, which those problems are caused by the change or flicker of the light source, the change of the shading, or an image-sampling device, a process of removing an average of luminance from the image $F_n$ (step S304) and removing an average of luminance from the background $B_n$ (step S305) is performed. Finally, utilizing the background $B_n'$ already having its average luminance value removed, the background region of the image $F_n'$ already having its average luminance value removed is removed (step S306) to obtain the foreground image.

Figure 4:
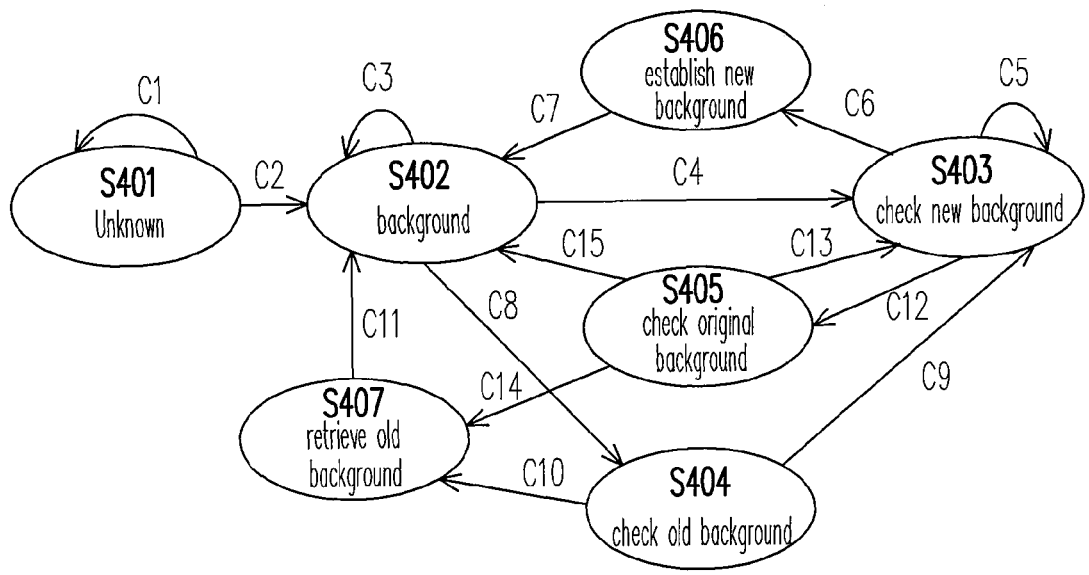
FIG. 4 is a state diagram of a multi-layered background registration according to one preferred embodiment of the present invention.

FIG. 4 is a state diagram of a multi-layered background registration according to one preferred embodiment of the present invention. As shown in FIG. 4, the pixel is initially in an unknown state S401. If the first difference value between a pixel value of the pixel and a pixel value in the corresponding location of a previous image is smaller than a threshold value, the static count of this pixel is accumulated. When the static count of this pixel reaches a static threshold value, it means that the pixel has held static for a preset time period and should be regarded as a non-dynamic background image. C1 is the condition that the static count has not yet reached the static threshold value and C2 is the condition that the static count has already reached the threshold value. Therefore, the pixel is labeled as a background state S402 and the background layer number of this pixel is recorded as 1, and the pixel is saved in the corresponding location of the $0^{th}$ layer of background data in the image database. The $0^{th}$ layer of background data is set to the background retrieved from the foregoing multi-layered background registration so as to remove a background region of the received image.

Next, when the pixel is in the background state S402 and if the first difference value between the pixel value of the pixel and the pixel value in the corresponding location of the previous image is smaller than the threshold value, the pixel has not changed. Therefore, the pixel data is saved in the corresponding location of the $0^{th}$ background data in the image database. C3 is the condition that the first difference value is smaller than the threshold value. If the first difference value between the pixel value of the pixel and the pixel value in a corresponding location of the previous image is greater than the threshold value and the background layer number of the pixel is 1, it means that the pixel has changed but the image database does not have appropriate background data. Hence, the pixel is labeled to check for a new background state S403. C4 is the condition that the first difference value is greater than the threshold value and there is no suitable background data inside the image database. If the first difference value between the pixel value of the pixel and the pixel in the corresponding location of the previous image is greater than the threshold value and the background layer number of the pixel is greater than 1, this implies that the pixel has changed and the image database includes other background data that can be inquired beside the $0^{th}$ layer background data. Therefore, the pixel is labeled to check for an old background state S404. C8 is the condition that the first difference value is greater than the threshold value and the image database includes other background data.

When the pixel is in the checking new background state S403 and if the first difference value between the pixel value of the pixel and the pixel value in the corresponding location of the previous image is greater than the threshold value, a change in the pixel has occurred. Thus, the pixel is labeled to check an original background state S405. C12 is the condition that the first difference value is greater than the threshold value. If the first difference value between the pixel value of the pixel and the pixel value in the corresponding location of the previous image is smaller than the threshold value, the static count of the pixel is accumulated. When the static count reaches the static threshold value, it means that the pixel has held static for the preset time period and should be regarded as a non-dynamic background image. Hence, the pixel is labeled to establish a new background state S406. C5 is the condition that the static count has not yet reached the static threshold value and C6 is the condition that the static count has already reached the static threshold value.

When the pixel is in the establishment of new background state S406, a number of background data in the image database is move to a higher background layer so as to empty the $0^{th}$ layer background data area. In addition, the pixel is saved to the image database in the corresponding location of the $0^{th}$ layer background data and the pixel is labeled as the background state S401. C7 is the condition that the establishment of the new background is completed.

When the pixel is in the check original background state S405, suitable background data is searched starting from the $0^{th}$ layer background data in the image database. The method of checking includes calculating a second difference value between the pixel value of the pixel and a pixel value in the corresponding location of a multiple of background data in the image database. If the second difference value is smaller than the threshold value, a suitable background data is found. If the suitable background data is a $0^{th}$ layer background data, the pixel is labeled a background state S402 and the pixel is saved to the corresponding location of the $0^{th}$ layer background data. C15 is the condition that the pixel matches the $0^{th}$ layer background If the suitable background data is found in the $i^{th}$ layer of background data ($1 \leq i \leq k$), wherein k is the quantity of background data stored in the image database, then the pixel is labeled as a retrieved old background state S407. C14 is the condition that the pixel matches one of the $1^{st}$ to $k^{th}$ layer of background data in the image database. If the suitable background data is not found, then the pixel is labeled to check as new background S403. C13 is the condition that none of the background data in the image database are suitable.

When the pixel is in a check old background state S404, suitable background data is searched starting from the $1^{st}$ layer background data in the image database. The method of checking includes calculating the second difference value between the pixel value of the pixel and the pixel value in a corresponding location of a multiple of background data in the image database. If the second difference value is smaller than the threshold value, a suitable background data is found, for example, in the $i^{th}$ layer of background data ($1 \leq i \leq k$), wherein k is the quantity of background data stored in the image database. Therefore, the pixel is labeled as a retrieved old background state S407. C10 is the condition that the pixel matches one of the $1^{st}$ to $k^{th}$ layer of background data in the image database. If no suitable background data is found in the image database, the pixel is labeled to check a new background state S403. C9 is the condition that none of the background data inside the image database are suitable.

When the pixel is in the retrieve old background state S407, the layers of the background data upper the suitable background data (the lower layer number of the background data) found in the image database move down (the higher layer number of the background data). In addition, the pixel is saved to the image database in the corresponding location of the $0^{th}$ layer background data and the pixel is labeled as a background state S401. C11 is the condition that the process of retrieving background data from the image database is completed.

In the foregoing description of the multi-layered background registration, the received image can be divided into a few conditions when the pixel is labeled as a background state. One of the conditions is that there is no change in the pixel of the current image. Thus, the pixel is utilized to renew the pixel in the corresponding location of the background. In another condition, there is a change in the pixel of the current image. Therefore, the image database is searched to find the suitable background data. If the suitable background data is found in the image database, the background can be instantly renewed without having to wait an initial cycle for performing a statistical analysis of the background. If no suitable background data is found in the image database, the pixel is checked to determine if it has held static for a preset time period. If the pixel has held static for a preset time period, the pixel is saved to the corresponding location of one of the background data in the image database.

Figure 5:
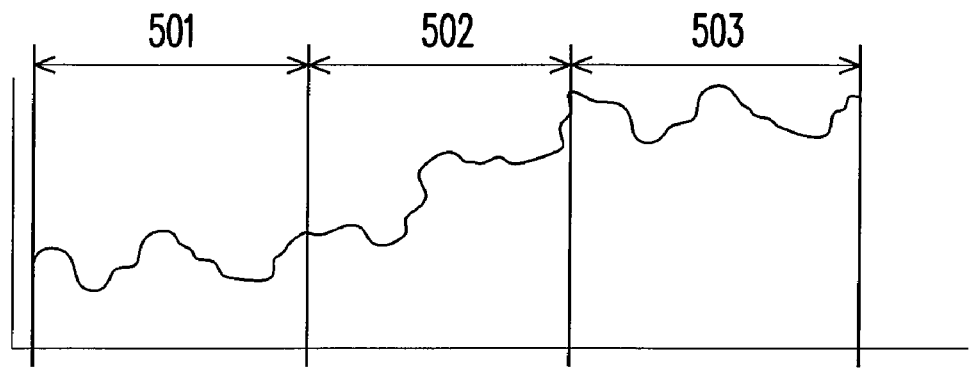
FIG. 5 is a diagram showing the effect of a variation of light source on image luminance value.

FIG. 5 is a diagram showing the effect of a variation of light source on image luminance value. As shown in FIG. 5, the ranges 501, 502 and 503 show the variations of luminance in the image under the conditions of uniform shadow, penumbra and without shadow respectively. Changes in the luminance of light source, the flickering of light source, the shading, or the image-sampling device may cause problems such as non-uniform luminance or luminance shift of image so that can easily lead to erroneous judgment of foreground and background images. Hence, through extracting the background and removing the average of luminance of the received image, the effects due to non-uniform luminance and luminance shift is minimized.

Figure 6A:
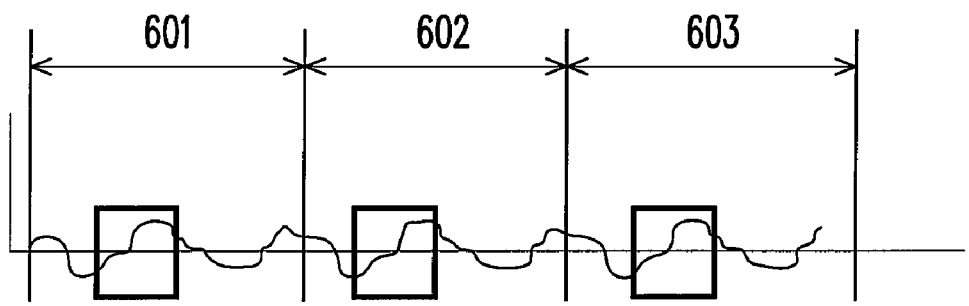
FIG. 6A is a diagram showing the process of removing an average of luminance from a background.
Figure 6B:
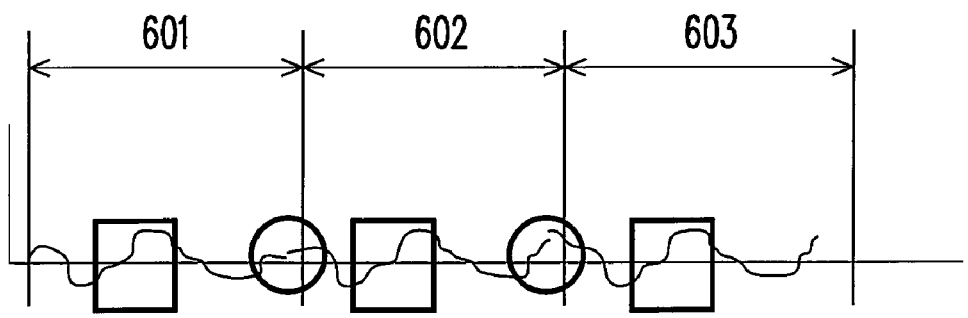
FIG. 6B is a diagram showing the process of removing an average of luminance from an image.

FIG. 6A is a diagram showing the process of removing an average of luminance from a background. FIG. 6B is a diagram showing the process of removing an average of luminance from an image. As shown in FIGS. 6A and 6B, the ranges 601, 602 and 603 show the variations of luminance in the image under the conditions of uniform shadow, penumbra and without shadow respectively after removing the average of luminance from the background and image. According to FIGS. 6A and 6B, the degree of influence of non-uniform luminance or luminance shift caused by the effect of light source variation, light source flickering, the shading is minimized to obtain an optimal foreground or background image.

The process of removing the average of luminance of an image includes retrieving the average pixel value of a plurality of pixels in a first block adjacent to the pixel, for example, the first block is a 3×3 window, and then subtracting the pixel average value from the pixel value of the pixel. In addition, the process of removing the average of luminance of a background includes finding a pixel in the background having an identical pixel location as the pixel, retrieving the pixel average value of a plurality of pixel in a second block adjacent to this pixel in the background, wherein the size of this second block and the aforementioned first block are identical, and finally subtracting the pixel average value from the pixel in the background.

Thereafter, the retrieved background $B_n$ is utilized to remove a background region of the image and obtain a foreground image. The process of removing the background region of the image includes utilizing the change detection mask and the object mask for setting this pixel to retrieve the foreground image of the image. The purpose of setting the change detection mask is the capacity to remove a background region of the image rapidly according to the change detection mask when a change in the pixel occurs, and then retrieve the foreground image of the image through the object mask. First, a third difference value between the pixel value of the pixel and a pixel value in the corresponding location of the background $B_n$ retrieved from the multi-layered background registration is obtained. If the third different value is smaller than the threshold value, then the change detection mask of this pixel is set to 0. In other words, there is no need to change the current object mask. If the third difference value is greater than the threshold value, then the change detection mask of this pixel is set to 1. Hence, the current object mask needs to be changed.

When the initial change detection mask of the pixel is 1, then a first block adjacent to the pixel is retrieved and a second block adjacent to the corresponding location in the background Bn' is retrieved, which both the image and the background have the average of luminance removed already. After that, the sum of the absolute values of subtracting each pixel inside the first block from each pixel in corresponding location inside the second block is obtained. If this sum is greater than a preset value, then the object mask of the pixel is set to 1. In other words, this pixel is the foreground image. If the sum is smaller than the preset value, then the object mask of the pixel is set to 0. The purpose of setting the change detection mask is the capacity for removing the background region of the image rapidly according to the change detection mask when the pixel changes. Thus, in another embodiment of the present invention, the foreground image can be directly retrieved through setting the pixel object mask.

Figure 7:
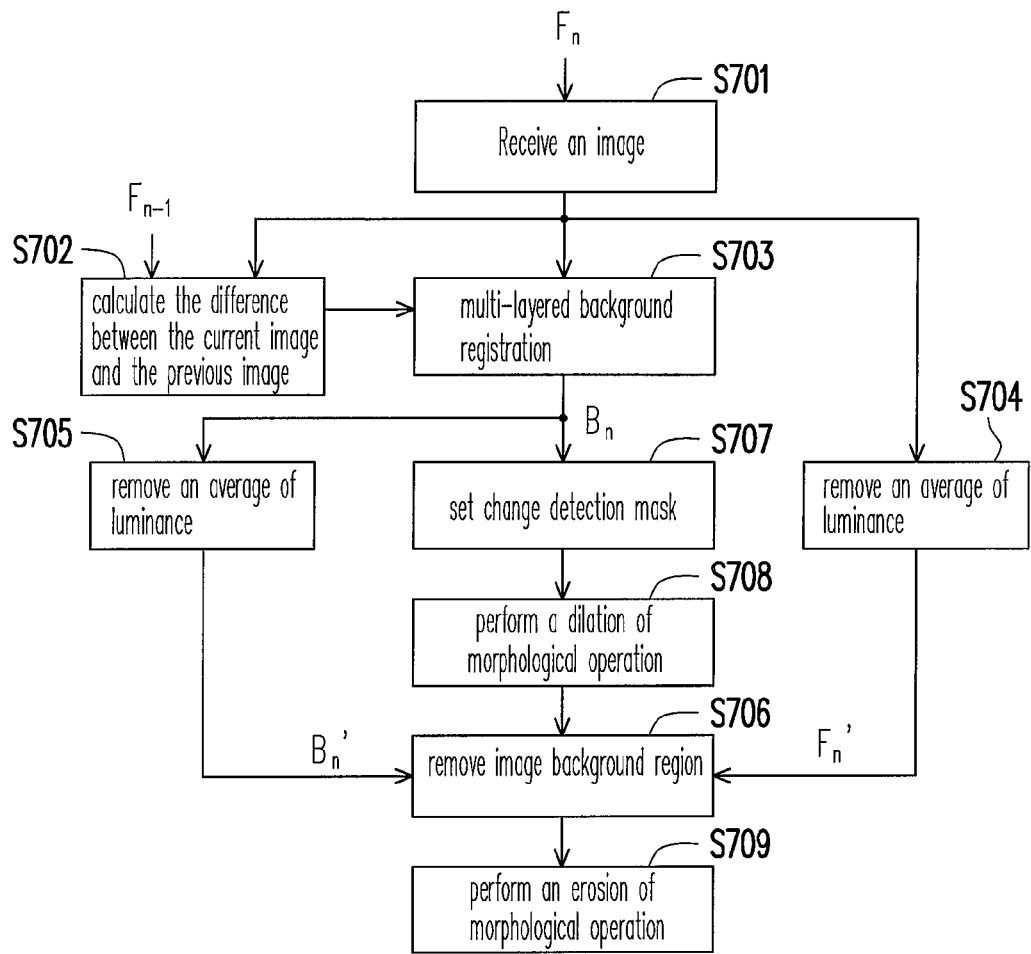
FIG. 7 is a flow diagram showing a video object segmentation method according to one preferred embodiment of the present invention.

FIG. 7 is a flow diagram showing a video object segmentation method according to one preferred embodiment of the present invention. As shown in FIGS. 3 and 7, the only difference between the embodiment in FIG. 3 and the one in FIG. 7 is that a dilation of morphological operation of the change detection mask image is performed (step S708) after processing the change detection mask (step S707) so that the boundary of the object region in the change detection mask image can expand out a pixel. Furthermore, after the process of removing an image background region (step S706), an erosion of morphological operation (step S709) of the image whose background region is removed, that is, the foreground image, is performed so that the boundary of the foreground region contracts a pixel. Through the dilation and erosion of morphological operation, the error pixel at the junction between the shadow region and the foreground image can be removed.

According to the foregoing embodiment, when the image changes, for example, the foreground image either moves or disappears, the changed pixel can compare with a number of background data in the image database to instantly retrieve a suitable background without having to wait for another calculation cycle to renewed the background. Hence, object segmentation or tracking can be continuously performed. Moreover, by removing the average of luminance from the image and the background, problems such as non-uniform luminance or luminance shift caused by light source variation, flickering, the shading variation, which those problems might lead to erroneous judgment of object segmentation, are avoided.

Furthermore, a video object segmentation system is implemented according to the video object segmentation method (as shown in the embodiment of FIG. 3). The video object segmentation system comprises a retrieving module, an operating module and a memory module. The retrieving module is used to receive a pixel of an image $F_n$, wherein the pixel has a corresponding location. The operating module is used to perform a calculation to find a first different value between a pixel value of the pixel and a pixel value in the corresponding location of a previous image, and then utilizes the first different value and the pixel to perform a multi-layered background registration (as shown in the embodiment of FIG. 4). The memory module is used to save k layers of background data, $1 \leq k \leq n$, wherein n is the maximum quantity of background data that can be stored.

The operation module fetches a background $B_n$ from the memory module and uses the background $B_n$ to remove a background region of the image $F_n$ after performing the multi-background registration. Besides, the video object segmentation system further comprises a luminance controlling module. The luminance controlling module is used to remove an average of luminance from the image $F_n$, and remove an average of luminance of the background $B_n$. Next, the operating module can utilize the background $B_n'$ with the average luminance of the background already removed and the image $F_n'$ with the average luminance of the background already removed to remove a background region of the image $F_n$.

Table 1 below compares the average execution speeds derived from experiments between the embodiments of the present invention and the conventional technique in FIG. 1. As shown in Table 1, the average execution speed of object segmentation for the conventional technique in FIG. 1 is 25.4 ms/frame. One of the designs of the present invention shown in FIG. 3 has an average execution speed of object segmentation of 19.3 ms/frame. A second design of the present invention shown in FIG. 7 has an average execution speed of object segmentation of 21.6 ms/frame.

TABLE 1

| Average execution speed | |
|---|---|
| FIG. 1 Conventional Technique | 25.4 ms/frame |
| First Design of the Present Invention | 19.3 ms/frame |
| Second Design of the Present Invention | 21.6 ms/frame |

Table 2 below compares the average error rates derived from experiments between the embodiments of the present invention and the conventional technique in FIG. 1. As shown in Table 2, the average error rate of object segmentation for the conventional technique in FIG. 1 is 0.428%. One of the designs of the present invention shown in FIG. 3 has an average error rate of object segmentation of 0.469%. A second design of the present invention shown in FIG. 7 has an average execution speed of object segmentation of 0.412%.

TABLE 2

| Average error rate | |
|---|---|
| FIG. 1 Conventional Technique | 0.428% |
| First Design of the Present Invention | 0.469% |
| Second Design of the Present Invention | 0.412% |

It should be noted that although the foregoing embodiments has already provided a description of the possible configurations of the video object segmentation method of the present invention, anyone skilled in the art may know that the standards for determining the background, foreground image, for example, the setting of the threshold value and the post-processing of the background and foreground image afterwards are different. Therefore, the application of the present invention should not be limited to this particular type of possible configuration. In other words, it falls within the scope of the present invention whenever a pixel determined to be the background is used to establish one of multi-layered background data, through which a suitable background is instantly retrieved.

In summary, the present invention determines a pixel of an image holding static for a preset time period as a background and uses that to establish one of a multi-layered background data. When the image changes, for example, the moving or disappearing of the foreground image, a suitable background can be instantly retrieved to serves as a basis for the object segmentation of an image without having to wait for another calculation cycle just to renew the background. Therefore, in a video environment with frequent cyclic switching, playing and monitoring, objects can be more correctly segmented out and then tracked or recognized. In addition, the degree of influence on judgment errors of the object segmentation caused by non-uniform luminance or luminance shift is also minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A video object segmentation method, comprising:
receiving a pixel of an image, wherein the pixel has a corresponding location;
performing a calculation to find a first difference value between a pixel value of the pixel and a pixel value in the corresponding location of a previous image;
utilizing the first difference value and the pixel to perform a multi-layered background registration, and retrieving a background; and
utilizing the background to remove a background region of the image,
wherein the multi-layered background registration comprises:
providing an image database, the image database saves k layers of background data, $1 \leq k \leq n$, wherein n is the maximum quantity of background data that can be stored in the image database;
determining a pixel in the corresponding location of the background being the pixel when the pixel is in a background state and the first difference value is smaller than a threshold value; and comparing the pixel and a pixel in the corresponding location of the background data for updating the background when the pixel is in the background state and the first difference value is greater than the threshold value, wherein comparing the pixel and the pixel in the corresponding location of the background data comprises:

performing a calculation to find a second difference value between the pixel value of the pixel and the pixel value in the corresponding location of the background data;

determining the pixel in the corresponding location of the background being the pixel when the second value is smaller than the threshold value;

determining if the pixel has held static for a preset time period when the second value is greater than the threshold value; and saving the pixel to the corresponding location of the $(k+1)^{th}$ background data, and determining the pixel in the corresponding location of the background being the pixel when the pixel has held static for the preset time period.

2. The video object segmentation method of claim 1, wherein the multi-layered background registration further comprises:

initially, determining if the pixel has held static for a preset time period; and labeling the pixel as the background state, and saving the pixel in the corresponding location of a newest layer of background data in the image database, and determining the background being the newest layer of background data, when the pixel has held static for a preset time period.

3. The video object segmentation method of claim 2, wherein determining if the pixel has held static for the preset time period comprises:

generating a count value accumulating the number of times the first difference value is smaller than the threshold value; and determining the pixel as having held static for the preset time period, when the count value reaches a static threshold value.

4. The video object segmentation method of claim 1, wherein determining if the pixel has held static for the preset time period comprises:

generating a count value accumulating the number of times the difference value is smaller than the threshold value; and determining the pixel as having held static for the preset time period, when the count value reaches a static threshold value.

5. The video object segmentation method of claim 1, wherein, before utilizing the background to remove the background region of the image, further comprises:

removing an average of luminance from the image; and
removing an average of luminance from the background.

6. The video object segmentation method of claim 5, wherein removing an average of luminance from the image comprises:

retrieving a pixel average value of a plurality of pixels in a first block adjacent to the pixel; and
subtracting the pixel average value from the pixel value of the pixel.

7. The video object segmentation method of claim 5, wherein removing an average of luminance from the background comprises:

retrieving a pixel average value of a plurality of pixels in a second block adjacent to the corresponding location of the background; and
subtracting the pixel average value from a pixel value in the corresponding location of the background.

8. The video object segmentation method of claim 1, wherein utilizing the background to remove the background region of the image comprises:

retrieving a first block adjacent to the pixel and a second block adjacent to the corresponding location of the background;

calculating a change of value between the first block and the second block; and setting the pixel to an object mask, when the change of value is greater than a preset value.

9. The video object segmentation method of claim 8, wherein the change of value is a sum of absolute values of subtracting each pixel inside the first block from each pixel in corresponding location inside the second block.

10. The video object segmentation method of claim 1, further comprising:

performing a calculation to find a third difference value between the pixel value of the pixel and a pixel value in the corresponding location of the background; and setting the pixel to a change detection mask, when the third difference value is greater than a threshold value.

11. The video object segmentation method of claim 10, wherein utilizing the background to remove the background region of the image further comprises:

retrieving a first block adjacent to the pixel and a second block adjacent to the corresponding location of the background, when the pixel is in the change detection mask;

performing a calculation to find a change of value between the first block and the second block; and setting the pixel to an object mask, when the change of value is greater than a preset value.

12. The video object segmentation method of claim 11, wherein the change of value is a sum of absolute values of subtracting each pixel inside the first block from each pixel in corresponding location inside the second block.

13. The video object segmentation method of claim 10, wherein, after setting the pixel to the change detection mask but before utilizing the background to remove the background region of the image, further comprises performing a dilation of morphological operation on the change detection mask image.

14. The video object segmentation method of claim 1, wherein, after utilizing the background to remove the background region of the image, further comprises performing an erosion of morphological operation on the image.

15. A video object segmentation method, comprising:

receiving a pixel of an image, wherein the pixel has a corresponding location;

performing a calculation to find a difference value between the pixel value of the pixel and a pixel value in the corresponding location of a previous image, and retrieving a background;

removing an average of luminance from the image;
removing an average of luminance from the background; and utilizing the background with the average luminance of the background already removed and the image with the average luminance of the image already removed to remove a background region of the image.

16. The video object segmentation method of claim 15, wherein removing the average luminance of the image comprises:
retrieving a pixel average value of a plurality of pixels in a first block adjacent to the pixel; and
subtracting the pixel average value from the pixel value of the pixel.

17. The video object segmentation method of claim 15, wherein removing the average luminance of the background comprises:
retrieving a pixel average value of a plurality of pixels in a second block adjacent to the corresponding location of the background; and
subtracting the pixel average value from a pixel value in the corresponding location of the background.

18. A video object segmentation system, comprising:
a retrieving module, for receiving a pixel of an image, wherein the pixel has a corresponding location;
a operating module, for performing a calculation to find a first difference value between a pixel value of the pixel and a pixel value in the corresponding location of a previous image, and then utilizing the first difference value and the pixel to perform a multi-layered background registration; and,
a memory module, for saving k layers of background data, $1 \leq k \leq n$, wherein n is the maximum quantity of background data that can be stored;
wherein the operating module retrieves a background from the memory module, and utilizes the background to remove a background region of the image, and the operating module determines a pixel in the corresponding location of the background to be the pixel when the pixel is in a background state and the first difference value is smaller than a threshold value, compares the pixel and a pixel in the corresponding location of the background data for updating the background when the pixel is in the background state and the first difference value is greater than the threshold value, performs a calculation to find a second difference value between the pixel value of the pixel and the pixel value in the corresponding location of the background data, determines the pixel in the corresponding location of the background to be the pixel when the second value is smaller than the threshold value, determines if the pixel has held static for a preset time period when the second value is greater than the threshold value, saves the pixel to the corresponding location of the $(k+1)^{th}$ background data in the memory module, and determines the pixel in the corresponding location of the background to be the pixel, when the pixel has held static for the preset time period.

19. The video object segmentation system of claim 18, wherein initially, the operating module determines if the pixel has held static for a preset time period; and the operating module labels the pixel as the background state and saves the pixel in the corresponding location of a newest layer of background data in the image database and determines the background to be the newest layer of background data, when the pixel has held static for a preset time period.

20. The video object segmentation system of claim 19, wherein the operating module generates a count value to accumulating the number of times the first difference value is smaller than the threshold value; and the operating module determines the pixel as having held static for the preset time period when the count value reaches a static threshold value.

21. The video object segmentation system of claim 18, wherein the operating module generates a count value accumulating the number of times the first difference value is smaller than the threshold value; and the operating module determines the pixel as having held static for the preset time period when the count value reaches a static threshold value.

22. The video object segmentation system of claim 18, further comprising:
a luminance controlling module, for removing an average of luminance from the image and removing an average of luminance from the background,
wherein the operating module utilizes the background with the average luminance of the background already removed and the image with the average luminance of the image already removed to remove a background region of the image.

23. The video object segmentation system of claim 22, wherein the luminance controlling module retrieves a pixel average value of a plurality of pixels in a first block adjacent to the pixel; and the luminance controlling module subtracts the pixel average value from the pixel value of the pixel.

24. The video object segmentation system of claim 22, wherein the luminance controlling module retrieves a pixel average value of a plurality of pixels in a second block adjacent to the corresponding location of the background; the luminance controlling module and subtracts the pixel average value from a pixel value in the corresponding location of the background.

25. The video object segmentation system of claim 18, wherein the luminance controlling module retrieves a first block adjacent to the pixel and a second block adjacent to the corresponding location of the background; the luminance controlling module calculates a change of value between the first block and the second block; and the luminance controlling module sets the pixel to an object mask, when the change of value is greater than a preset value.

26. The video object segmentation system of claim 25, wherein the change of value is a sum of absolute values of subtracting each pixel inside the first block from each pixel in corresponding location inside the second block.

27. The video object segmentation system of claim 18, wherein the operating module performs a calculation to find a third difference value between the pixel value of the pixel and a pixel value in the corresponding location of the background; and the operating module sets the pixel to a change detection mask, when the third difference value is greater than a threshold value.

28. The video object segmentation system of claim 27, the operating module retrieves a first block adjacent to the pixel and a second block adjacent to the corresponding location of the background, when the pixel is in the change detection mask; the operating module performing a calculation to find a change of value between the first block and the second block; and the operating module sets the pixel to an object mask, when the change of value is greater than a preset value.

29. The video object segmentation system of claim 28, wherein the change of value is a sum of absolute values of subtracting each pixel inside the first block from each pixel in corresponding location inside the second block.

30. The video object segmentation system of claim 27, wherein the operating module performs a dilation of morphological operation on the change detection mask image after setting the pixel to the change detection mask but before utilizing the background to remove the background region of the image.

31. The video object segmentation system of claim 18, wherein the operating module performs an erosion of morphological operation on the image after utilizing the background to remove the background region of the image.

32. A video object segmentation system, comprising:
- a retrieving module, for receiving a pixel of an image, wherein the pixel has a corresponding location;
- a operating module, for performing a calculation to find a first difference value between a pixel value of the pixel and a pixel value in the corresponding location of a previous image, and retrieving a background; and,
- a luminance controlling module, for removing an average of luminance from the image and removing an average of luminance from the background,
- wherein the operating module utilizes the background with the average luminance of the background already removed and the image with the average luminance of the image already removed to remove a background region of the image.

33. The video object segmentation system of claim 32, wherein the luminance controlling module retrieves a pixel average value of a plurality of pixels in a first block adjacent to the pixel; and the luminance controlling module subtracts the pixel average value from the pixel value of the pixel.

34. The video object segmentation system of claim 32, wherein the luminance controlling module retrieves a pixel average value of a plurality of pixels in a second block adjacent to the corresponding location of the background; the luminance controlling module and subtracts the pixel average value from a pixel value in the corresponding location of the background.

* * * * *